Aug. 18, 1942.  H. N. KATZ  2,293,653
LOCKING AND RELEASING DEVICE
Filed July 17, 1941  2 Sheets-Sheet 1
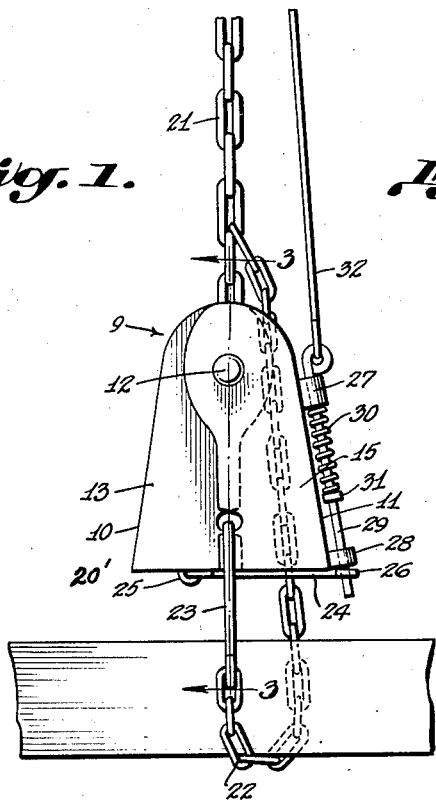
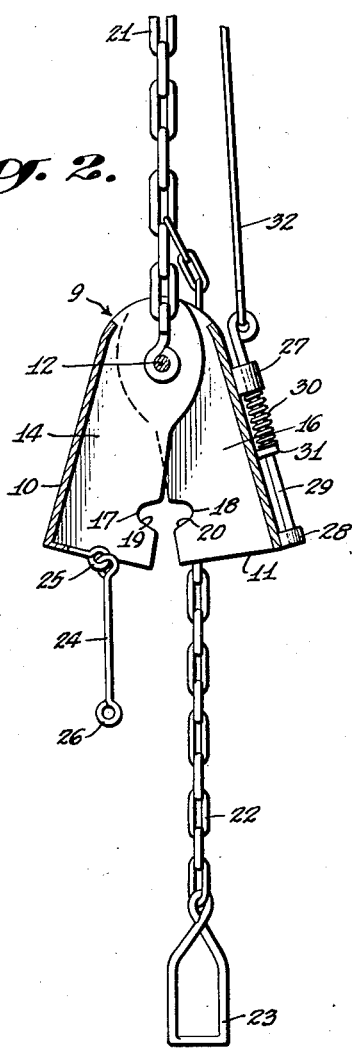
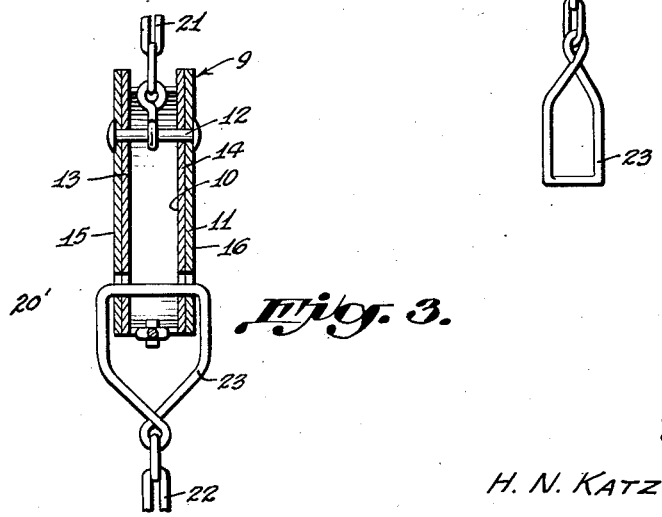
Inventor
H. N. KATZ
By Ben Cohen
Attorney Aug. 18, 1942.  H. N. KATZ  2,293,653
LOCKING AND RELEASING DEVICE
Filed July 17, 1941  2 Sheets-Sheet 2
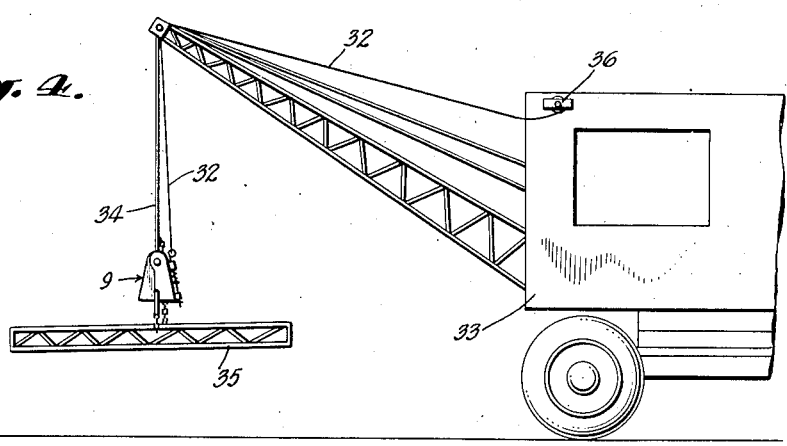
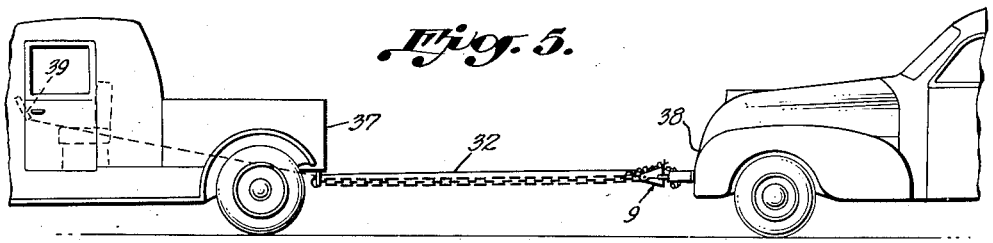
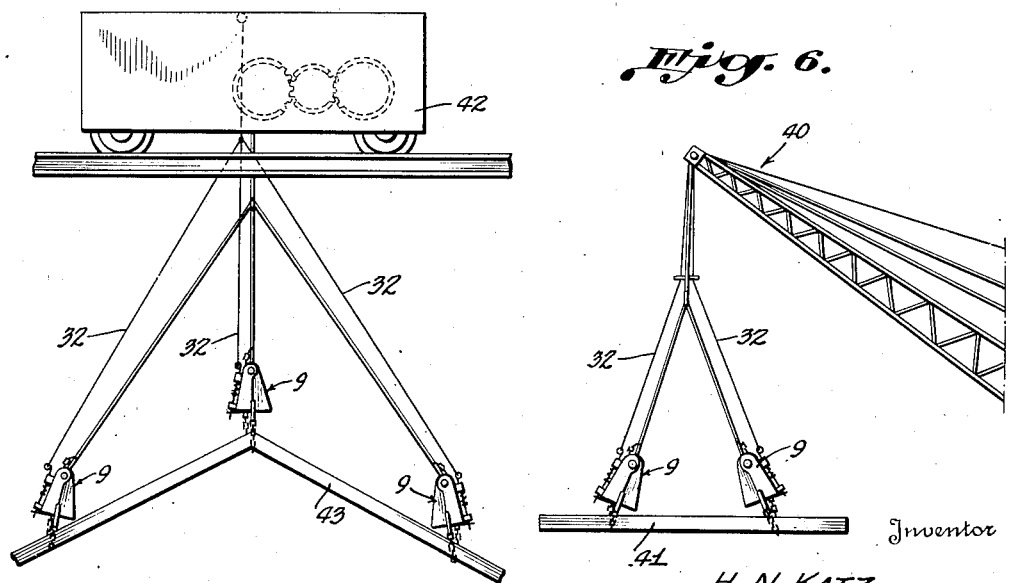

Patented Aug. 18, 1942

2,293,653

UNITED STATES PATENT OFFICE 2,293,653

LOCKING AND RELEASING DEVICE

Heyman N. Katz, Spring Lake, N. J.

Application July 17, 1941, Serial No. 402,886

6 Claims. (Cl. 294—83)

This invention relates to improvements in locking and releasing devices for cables, tow lines and the like.

The primary object of the present invention is the provision of a locking device which may be readily connected to cables, tow lines and the like and which will positively hold the supported burden without any chance of accidental release but which will effect positive release of the locking member when the operating member is operated to release position.

A further object of the present invention is to provide a locking and release device which is relatively simple in construction, inexpensive to manufacture, which is very strong, and while it may be unclasped very readily when desired, it will be perfectly safe against accidental opening.

The foregoing and further objects will be more fully apparent from the accompanying drawings forming part of this disclosure, and by the following description.

Referring now to the accompanying drawings:

Figure 1 is a side elevation of the device in locked position.

Figure 2 is a side elevation of the device in unlocked position.

Figure 3 is a section on line 3—3 of Figure 1.

Figure 4 is a view showing one form of the device associated with a conveyor crane.

Figure 5 is a view showing the device used as a tow line.

Figure 6 is a view showing the manner of using two locking and releasing devices with a crane.

Figure 7 is a view showing the use of a plurality of the devices with an overhead conveyor.

Referring now to the drawings, the device, generally indicated by the numeral 9, consists of toggle members 10 and 11, pivotally secured adjacent one end by means of a pivot pin or bolt 12. The member 10 comprises side walls 13 and 14, the outer edge portions of which are receivable within the outer edge portions of side walls 15 and 16 of complementary toggle member 11. The side walls 13 and 14 are provided with slots 17 terminating in sloping portions 19. The side walls 15 and 16 are similarly provided with slots 18 and sloping portions 20. As seen in Figure 1, in the closed position of the toggle members, the slots 17 and 18 cooperate to form a substantially closed slot 20' for a purpose to be described.

As seen in Figures 1, 2 and 3, a supporting chain 21 is connected to pivot pin or bolt 12 and carries the entire locking and release device. A chain 22 has one end connected to chain 21 adjacent its lower end. A link or hook 23 is mounted at the other end of chain 22 and is adapted to be received in the closed slot 20' as seen in Figures 1 and 3.

A locking pin 24 is secured at one end to an eye 25 formed in the lower end of toggle member 10 as clearly shown in Figure 2. The other end of pin 24 is provided with an eye 26 for a purpose to be described.

A pair of spaced ears 27 and 28 are provided along one side of toggle member 11. Slidably received within the ears 27 and 28 is a releasing pin 29. A spring 30 is mounted on the pin 29 between ear 27 and an abutment 31 formed approximately midway of pin 29, normally holding the pin 29 in the extended position shown in Figure 1. A pull wire or cable 32 is secured to the upper end of pin 29 for retracting the pin against the action of the spring.

In the practical use of this device, the chain 22 is folded about the article to be supported or pulled and the loop or hook member 23 received within the cooperating slots 17 and 18 forming the closed slot 20'. The releasing pin 29 is then slipped through eye 26 on locking pin 24 thus holding toggle members 10 and 11 against separation. To release hook 23, it is merely necessary to pull on wire 32, retracting pin 29, which in turn releases pin 24. The weight or pull of the supported article acting on loop 23 will cause loop 23 to slide along sloping portions 19 and 20, thus causing separation of the toggle members and release of the supported article.

In Figure 4, the device 9 is shown in connection with a conveyor crane 33, supporting said device through cables 34. The free end of the pull wire 32 is attached to the crane at a point 36 adjacent the window of the conveyor cab so that the operator within the cab can readily operate wire 32 to release the supported article, illustrated as a girder 35.

In Figure 5, the device is illustrated in use as a tow line. One end of the chain is secured to a tow car 37 and the releasable chain 22 is secured to the bumper of the car 38 to be towed. The free end of the pull wire 32 is secured within the driving compartment of the tow car. Thus, the driver by a mere pull on the wire 32 can effect release of the car being towed without stopping the two cars.

Figure 6 illustrates a form in which two clamping devices may be connected to a crane 40 for supporting or carrying a beam 41. The free ends of pull wires 32 may be operated from a single point in the same manner illustrated in Figure 4.

Figure 7 shows the use of three locking and release devices connected to an overhead conveyor 42 for conveying an irregular shaped girder 43. The pull wires 32 are connected at their free ends in the same manner previously described. It is obvious that any number of locking and release devices may be used.

Thus it will be seen that the construction herein shown and described is well adapted to accomplish the objects of the present invention. It will be understood, however, that the invention may be embodied otherwise than here shown and that in the embodiments illustrated, certain changes in the construction may be made. Therefore, I do not wish to be limited precisely to the constructions herein shown except as may be required by the appended claims considered with reference to the prior art.

Having thus described my invention, what is claimed is:

1. In a device of the class described, a pair of toggle members pivotally connected at one end, the opposite ends of said toggle members having slots formed therein, said slots cooperating to form a substantially closed slot, a locking pin mounted on one of the toggle members, means mounted on the other toggle member cooperating with said locking pin to hold the toggle members in closed position, a hook receivable within said closed slot, and means for releasing the locking pin for causing separation of said toggle members for effecting release of said hook member.

2. In a device of the class described, a pair of toggle members pivotally connected at one end, the opposite ends of said toggle members having slots formed therein, said slots cooperating to form a substantially closed slot, a locking pin mounted on one of the toggle members, a releasing pin mounted on the other toggle member cooperating with said locking pin to hold the toggle members in closed position, a hook receivable within said closed slot, and means operating said releasing pin to effect release of the locking pin thereby causing separation of said toggle members and release of the hook member.

3. In a device of the class described, a pair of toggle members pivotally connected at one end, the opposite ends of said toggle members having slots formed therein, said slots cooperating to form a substantially closed slot, a locking pin mounted on one of the toggle members, a releasing pin mounted on the other toggle member cooperating with said locking pin to hold the toggle members in closed position, a hook receivable within said closed slot, and a pull wire for operating said releasing pin to effect release of the locking pin thereby causing separation of said toggle members and release of the hook member.

4. In a device of the character described, a pair of toggle members pivotally connected at one end, a supporting member connected to said pivotal means, the toggle members having means at their lower ends forming an enclosed slot portion, a locking pin for holding the toggle members in closed position, means for releasing said locking pin, a hook receivable in said slot portion, and means connecting said hook to said supporting member, said last named means being adapted to support an article.

5. In a device of the character described, a pair of toggle members pivotally connected at one end, a supporting member connected to said pivotal means, the toggle members having means at their lower ends forming an enclosed slot portion, a locking pin for holding the toggle members in closed position, a releasing pin for releasing said locking-pin, a hook receivable in said slot portion, and means connecting said hook to said supporting member, said last named means being adapted to support an article.

6. In a device of the character described, a pair of toggle members pivotally connected at one end, a supporting member connected to said pivotal means, the toggle members having means at their lower ends forming an enclosed slot portion, a locking pin for holding the toggle members in closed position, a releasing pin for releasing said locking pin, a pull wire for operating said releasing pin, a hook receivable in said slot portion, and means connecting said hook to said supporting member, said last named means being adapted to support an article.

HEYMAN N. KATZ.